(12) United States Patent
Leermann

(10) Patent No.: US 12,168,744 B2
(45) Date of Patent: Dec. 17, 2024

(54) ADHESIVE TAPE FOR WRAPPING MOTOR-VEHICLE CABLES

(71) Applicant: CERTOPLAST TECHNISCHE KLEBEBÄNDER GMBH, Wuppertal (DE)

(72) Inventor: Timo Leermann, Wuppertal (DE)

(73) Assignee: CERTOPLAST TECHNISCHE KLEBEBAENDER GMBH, Wuppertal (DE)

( * ) Notice: Subject to any disclaimer, the term of this patent is extended or adjusted under 35 U.S.C. 154(b) by 380 days.

(21) Appl. No.: 16/971,850

(22) PCT Filed: Feb. 27, 2019

(86) PCT No.: PCT/EP2019/054886
§ 371 (c)(1),
(2) Date: Aug. 21, 2020

(87) PCT Pub. No.: WO2019/174917
PCT Pub. Date: Sep. 19, 2019

(65) Prior Publication Data
US 2021/0002519 A1    Jan. 7, 2021

(30) Foreign Application Priority Data
Mar. 12, 2018  (DE) .................. 202018101383.1

(51) Int. Cl.
*C09J 7/29*  (2018.01)
*B32B 5/02*  (2006.01)
(Continued)

(52) U.S. Cl.
CPC ................ *C09J 7/29* (2018.01); *B32B 5/022* (2013.01); *B32B 5/26* (2013.01); *B32B 7/12* (2013.01);
(Continued)

(58) Field of Classification Search
CPC ........... Y10T 428/24033; Y10T 428/27; Y10T 428/28; Y10T 428/2813; Y10T 428/2817;
(Continued)

(56) References Cited

U.S. PATENT DOCUMENTS 8,815,389 B2    8/2014  Kuelper

FOREIGN PATENT DOCUMENTS

DE    102004015019 B3 *  8/2005  ............. B32B 27/12
EP         1911824 A1 *  4/2008  ................ C09J 7/29
(Continued)

OTHER PUBLICATIONS

Machine translation (Espacenet) of EP 1911824 A1. Translated Oct. 3, 2022. (Year: 2022).*
(Continued)

*Primary Examiner* — Maria V Ewald
*Assistant Examiner* — Ethan A. Utt
(74) *Attorney, Agent, or Firm* — Andrew Wilford

(57) ABSTRACT

The subject matter of the invention is an adhesive tape, in particular a wrapping tape for sheathing cables (1) in automobiles, comprising a strip-type fabric backing (2, 3) that has at least one first layer (2) made of a woven fabric and a second layer (3) made of a nonwoven, the two layers being coupled together by a polymer layer (4) and/or by threads that penetrate both layers (2, 3), and comprising an adhesive layer (5) applied to at least one side of the backing (2, 3), characterised in that the nonwoven is produced from an aromatic polyamide.

6 Claims, 1 Drawing Sheet

(51) Int. Cl.
  *B32B 5/26*     (2006.01)
  *B32B 7/12*     (2006.01)
  *C09J 7/21*     (2018.01)
  *D03D 15/283*   (2021.01)

(52) U.S. Cl.
  CPC .............. *C09J 7/21* (2018.01); *D03D 15/283* (2021.01); *B32B 2250/02* (2013.01); *B32B 2250/20* (2013.01); *B32B 2262/0261* (2013.01); *B32B 2262/0276* (2013.01); *B32B 2307/554* (2013.01); *B32B 2307/558* (2013.01); *B32B 2307/718* (2013.01); *B32B 2405/00* (2013.01); *C09J 2203/302* (2013.01); *C09J 2301/122* (2020.08); *C09J 2400/263* (2013.01); *C09J 2433/00* (2013.01); *C09J 2467/006* (2013.01); *C09J 2477/006* (2013.01)

(58) Field of Classification Search
  CPC ......... Y10T 428/2826; Y10T 428/2848; Y10T 428/2852; Y10T 428/2878; Y10T 428/2891; Y10T 428/31725; Y10T 428/31728; Y10T 428/31736; Y10T 428/3175; Y10T 442/30; Y10T 442/3707; Y10T 442/3724; Y10T 442/3772; Y10T 442/3854; Y10T 442/3862; Y10T 442/387; Y10T 442/3878; Y10T 442/3886; Y10T 442/3894; Y10T 442/3902; Y10T 442/50; Y10T 442/60; Y10T 442/674; Y10T 442/675; Y10T 442/676; Y10T 442/677; Y10T 442/678; Y10T 442/679; B32B 5/00; B32B 5/02; B32B 5/022; B32B 5/024; B32B 5/06; B32B 5/067; B32B 5/073; B32B 5/10; B32B 5/22; B32B 5/24; B32B 5/26; B32B 5/262; B32B 5/265; B32B 7/00; B32B 7/04; B32B 7/08; B32B 7/09; B32B 7/12; B32B 27/00; B32B 27/02; B32B 27/04; B32B 27/08; B32B 27/12; B32B 27/34; B32B 27/36; B32B 2262/00; B32B 2262/02; B32B 2262/0261; B32B 2262/0269; B32B 2262/0276; B32B 2262/0284; B32B 2305/10; B32B 2305/18; B32B 2305/188; B32B 2305/20; B32B 2307/206; B32B 2307/554; B32B 2367/00; B32B 2377/00; B32B 2405/00; B32B 2457/00; B32B 2605/00; Y10S 428/9088; C09J 7/00; C09J 7/20; C09J 7/21; C09J 7/22; C09J 7/29; C09J 7/35; C09J 133/00; C09J 133/04; C09J 133/06; C09J 133/08; C09J 133/10; C09J 133/12; C09J 2203/302; C09J 2203/354; H01B 3/00; H01B 3/18; H01B 3/30; H01B 3/42; H01B 3/44; H01B 3/447; H01B 3/48; H01B 3/485; H01B 3/50; H01B 7/00; H01B 7/0045; H01B 7/0208; H01B 7/0216; H01B 7/0225; H01B 7/0241; H01B 7/025; H01B 7/0258; H01B 7/0291; H01B 7/17; H01B 7/18; H01B 7/182; H01B 7/187; H01B 7/1875; H01B 7/188; H01B 7/28; H01B 7/29; H01B 7/292; H01B 7/295; H10B 7/02
  USPC ....... 428/102, 219, 340, 343, 346, 347, 349, 428/354, 355 R, 355 EN, 355 AC, 474.4, 428/474.7, 475.2, 476.3, 908.8; 442/181, 442/268, 270, 276, 286–292, 320, 324, 442/327, 394–398, 402, 408; 174/68.1, 174/110 R, 113 R, 114 R, 115, 120 R, 174/121 R, 121 A, 121 SR, 122 R, 174/120 SR, 124 R, 110 SR, 110 N, 174/110 D
  See application file for complete search history.

(56)           References Cited

FOREIGN PATENT DOCUMENTS

| | | |
|---|---|---|
| EP | 1911824 A | 11/2010 |
| WO | 2009086570 A | 7/2009 |

OTHER PUBLICATIONS

Machine translation (Espacenet) of DE 102004015019 B2. Translated Oct. 5, 2022. (Year: 2022).*

* cited by examiner

ADHESIVE TAPE FOR WRAPPING MOTOR-VEHICLE CABLES

CROSS REFERENCE TO RELATED APPLICATIONS

This application is the US-national stage of PCT application PCT/EP2019/054886 filed 27 Feb. 2019 and claiming the priority of German patent application 202018101383.1 itself filed 12 Mar. 2018.

FIELD OF THE INVENTION

The invention relates to an adhesive tape, in particular tape for wrapping cables in automobiles, comprising a textile substrate band comprising at least a first layer consisting of a woven fabric, and a second layer consisting of a nonwoven, the layers being connected to each other by a polymer layer and/or by filaments that penetrate both layers, and comprising an adhesive layer that is applied to at least one side of the substrate band.

BACKGROUND OF THE INVENTION

Adhesive tapes and in particular wrapping tapes for sheathing automobiles must meet a plurality of different, and sometimes conflicting, requirements. For example, typically a high media resistance to for example oil or petrol is required for adhesive tapes of this kind. Furthermore, an increased temperature resistance, for example in the range of from minus 50° C., in particular minus 40° C., up to plus 150° C. and more is required. Furthermore, noise-damping properties are often considered advantageous, in order in particular to prevent rattling sounds when installed. Furthermore, simple processing is usually also desirable, such that the adhesive tapes in question can be torn by hand.

Recently, higher mechanical demands are increasingly placed on the adhesive tapes in question. Thus, for example in the case of abrasive stress the wear should not be too great, in order to protect the wrapped cable, in each case, from damage. Furthermore, nowadays further requirements increasingly come into play, such that increased cut resistance or impact strength of the adhesive tapes is required. This can be traced back to the fact that the adhesive tapes in question are often intended to protect electrical supply cables from breaking, for example instead of wraparound sleeves.

Requirements of this kind result for example for the case in which the motor vehicle equipped with an adhesive tape of this kind is involved in a collision, and in particular a side impact. In this case, there is a risk of electrical supply cables, for example to door locks, being cut or at least damaged.

As a result, the door locks in question can often no longer be opened. This also applies for the respective motor vehicle doors, which impedes deployment of arriving rescue services for example. Hitherto, there are no promising solutions available at this point.

For example, the closest and category-defining prior art according to EP 1 911 824 relates, overall, to a cable wrapping tape comprising a two-layer textile substrate band. The first textile layer is a woven fabric. The second textile layer is formed as a nonwoven fabric. The nonwoven is in turn formed as a stitch-bonded nonwoven. The two textile layers are interconnected by an acrylate adhesive.

The woven fabric of the first textile layer and/or the nonwoven of the second textile layer can be formed, overall, of a polyamide and/or a polyester material. Since the nonwoven is formed as a stitch-bonded nonwoven, an increased tear strength is provided. However, nonwovens of this kind are still not particularly impact-resistant or cut-resistant. In this case, it should be taken into account that, when installed, the above-described adhesive tape is equipped with an outwardly facing woven fabric, while the adhesive layer is applied to the nonwoven.

WO 2005/085379 [U.S. Pat. No. 8,815,389] relates to a comparable adhesive tape. In this case, the focus is again on a highly abrasion-resistant and noise-damping tape for binding cable harnesses. Here the substrate band comprises a first cover layer and a second cover layer which are rigidly interconnected, over the entire surface, by a further intermediate layer. The first cover layer can be formed as a woven fabric. In contrast, the second cover layer is a velour, an inlaid scrim, a woven fabric or a knitted fabric, i.e. overall a nonwoven is not used. The nonwoven can instead be used as the intermediate layer in this known teaching.

The prior art according to WO 2009/086570, which should finally also be taken into account, relates overall to a protection device that is also formed of a compound consisting of a mechanical protection layer, a polymer connection layer, and an adhesive layer. The mechanical protection layer can be a nonwoven. In this case, high-strength organic fibers such as aromatic polyamides can in principle also be used. However, an additional layer consisting of a woven fabric is lacking.

OBJECT OF THE INVENTION

The object of the invention is to develop an adhesive tape, and in particular tape for wrapping cables in automobiles, of the above-described type, such that overall the puncture resistance or impact resistance is increased compared with known embodiments, while the abrasion resistance remains high, as before.

SUMMARY OF THE INVENTION

In order to attain this object an adhesive tape, in particular for wrapping cables in automobiles, of the type in question, is characterized within the context of the invention in that the nonwoven is produced from an aromatic polyamide.

In fact, it has been found to be particularly favorable, within the context of the invention, for special polyamides, specifically aromatic polyamides, to be used for producing the nonwoven. In this case these are polyamides in which the amide groups are bound to aromatic groups. Aromatic polymers of this kind are marketed under trade names such as "Kevlar" or "Twaron" and are available in principle.

In fact, the aromatic polyamides in question for producing the nonwoven or the second layer of the nonwoven are characterized in that they have a high strength and also a high impact resistance, as well as stretch-to-break strength. As a result, the second layer or nonwoven layer based on the aromatic polyamides generally results in it being possible, in the case of the adhesive tape according to the invention, to absorb any shock or cutting stress. For this purpose, in general the second nonwoven layer is oriented, when installed, so as to face inward. That is to say that, insofar as the adhesive tape is used as tape for wrapping cables in automobiles, the design and arrangement of the cable or the plurality of cables in question is selected such that, in the cable, the second nonwoven layer faces inward in the wrapped state. For this purpose, the second layer or the nonwoven is also equipped with the required adhesive layer, in order to ensure adhesion of the adhesive tape according to the invention to the cables.

In contrast, the first layer consisting of the woven fabric is generally oriented so as to face outward. As a result, when installed, cutting or shock stress of the adhesive tape according to the invention first occurs on the woven fabric, and only subsequently on the nonwoven second layer and the aromatic polyamide fibers provided there. As a result, it should be expected that, due to the outwardly facing arrangement thereof, the woven fabric will absorb any abrasion stresses without problem. Additional cutting stresses or impact stresses are then absorbed particularly effectively by the nonwoven arranged therebelow. This is because the fibers used, consisting of the aromatic polyamide, first ensure damping of possible impact stresses within the nonwoven layer. Furthermore, any cuts or cutting stress are absorbed without problem by the nonwoven in question, owing to the high tensile strength and toughness of the individual fibers. In addition, the nonwoven simultaneously damps noise.

The woven fabric layer, which faces toward the outside in the installed stage, ensures the additionally required abrasion resistance. For this purpose, the woven fabric generally comprises filaments consisting of polyamide (PA) and/or polyester (PET). Combinations are also conceivable. Woven fabrics consisting of filaments of this kind are particularly abrasion-resistant, as demonstrated by way of example by the above-mentioned EP 1 911 824. In fact it is possible in this manner to achieve average abrasion resistance levels of at least abrasion class C according to LV 312 for the adhesive tape according to the invention. In general, even a higher abrasion protection according to class D, and sometimes even higher, up to class E, is observed.

In this connection, the filaments of the woven fabric typically have a fineness of at least 100 dtex. Usually, even finenesses of 150 dtex and more are observed. The number of warp and weft filaments in the woven fabric in question can be from 5 filaments/cm to 60 filaments/cm, or even up to 80 filaments/cm. Furthermore, warp and weft filaments of the same strength are typically used. That is to say that it is explicitly not necessary to resort to much thicker weft filaments than warp filaments, for example according to the prior art pursuant to EP 2 322 385. Instead, the two-layer structure comprising the woven fabric and the nonwoven made of the aromatic polyamide fibers ensures, in combination, that both the requirements of impact strength according to LV 312-3 (2009) are met, and abrasion class C and in particular D and more, according to LV 312-1 (2009) is observed.

The nonwoven used is advantageously a mechanically strengthened needled felt. For this purpose, the nonwoven can be mechanically strengthened by water jets and/or air and/or needling. The invention thus purposely omits a stitch-bonded nonwoven, as is considered indispensable within the context of EP 1 911 824.

This is because it has been found that, although a stitch-bonded nonwoven has a high tensile strength in the longitudinal direction, this is neither required nor necessary, in the compound according to the invention, and therefore the additional step of overstitching the nonwoven can be omitted and, accordingly, the production can be simplified and rendered cost-effective. This is because nonwovens that are strengthened mechanically by water jets and/or needling can be produced in a particularly simple and cost-effective manner. In this case, the required tensile strength and tearing strength of the adhesive tape according to the invention results, overall, from the combined effect between the nonwoven and the woven fabric.

The textile substrate band generally has a basis weight of from 50 g/m² to 500 g/m². In this case, both the woven fabric and the nonwoven can in each case have a basis weight of from 50 g/m² to 200 g/m². The adhesive coating generally has a grammage of from 50 g/m² to 150 g/m².

As a result, an adhesive tape is consequently provided that not only fulfils the typical requirements with respect to temperature resistance and media resistance, but rather the two-layer structure consisting of the woven fabric and the nonwoven furthermore ensures a noise-damping effect when used as intended as a tape for wrapping cables in automobiles. In this case, the adhesive tape can in principle be looped around the cable in question, as a longitudinal sheathing. In general, however, the adhesive tape is wound around the cable in question in a spiral or helical manner, having an adhesive coating facing toward the cable.

As a result, the second nonwoven layer faces inward. Since the nonwoven is produced from an aromatic polyamide or corresponding aromatic polyamide fibers, in particular a high degree of impact strength and cut resistance is provided. The woven fabric located opposite additionally contributes to an increased abrasion resistance. Additional layers for achieving the substrate band are not required, although they are possible. That is to say that, in general, the substrate band ultimately consists of the first layer consisting of the woven fabric and the second nonwoven layer.

The nonwoven can generally be one in which fibers of a limited length, i.e. staple fibers, are used. Furthermore, however, endless fibers or filaments can also be used. In general, a non-woven fabric is used, i.e. one made up of staple fibers. The fibers are mechanically needled, specifically by air or water jet needling. As a result, the nonwoven in question or the second nonwoven layer is provided with the necessary mechanical stability.

BRIEF DESCRIPTION OF THE DRAWING

In the following, the invention will be explained in greater detail with reference to drawings showing merely one embodiment, in which drawings.

SPECIFIC DESCRIPTION OF THE INVENTION

Figure 1:
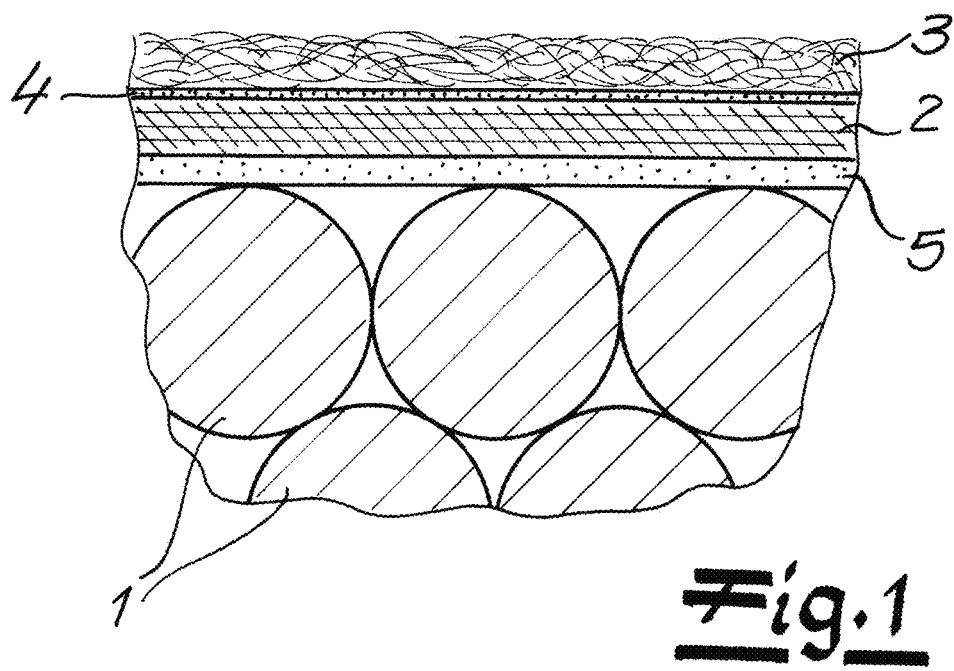
FIG. 1 shows a first embodiment of the adhesive tape according to the invention.

The adhesive tape according to the invention for wrapping cables 1 in automobiles is first provided with a textile substrate band 2, 3. The textile substrate band 2, 3 is composed of a first layer 2 consisting of a woven fabric, and a second layer 3 consisting of a nonwoven. According to the embodiment, the two layers 2, 3 are rigidly interconnected by a polymer layer 4 that bonds together the two layers 2, 3 over their entire surfaces. The polymer layer 4 can be an adhesive layer. Alternatively or in addition, the two layers 2, 3 can also be coupled together by filaments that penetrate the two layers 2, 3 in a manner similar to sewing filaments in a stitch-bonded nonwoven. Furthermore, an adhesive layer 5 is also provided that is applied on at least one side of the substrate band 3, 4.

Figure 2:
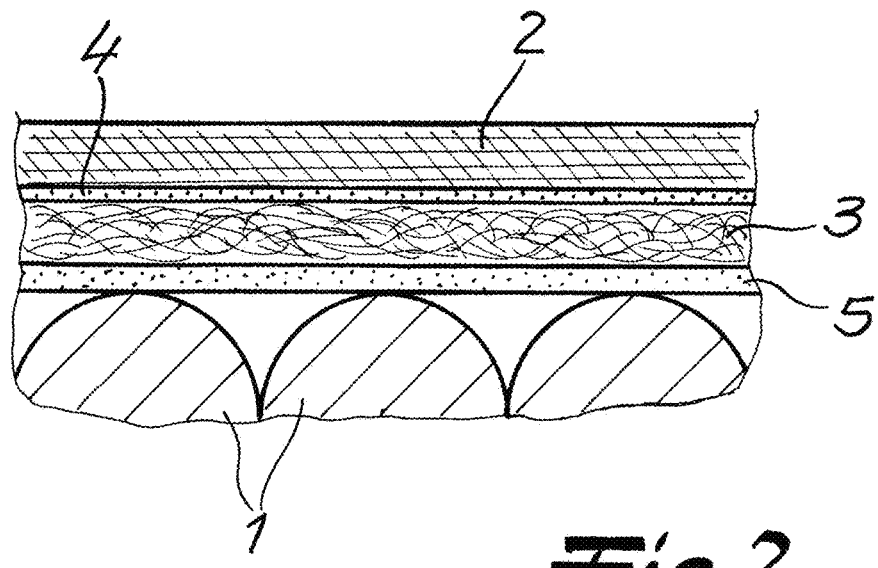
FIG. 2 shows a second preferred embodiment of the adhesive tape according to the invention.

According to the embodiment in FIG. 1, the adhesive layer 5 is located on the first layer or the woven fabric. Accordingly, the woven fabric comprising the adhesive layer 5 thereon is oriented toward the inside, facing toward the cables 1 to be sheathed. In contrast, when installed shown in FIG. 1 the second nonwoven layer 3 faces outward. In the preferred embodiment in FIG. 2, the arrangement is reversed. In this case, the second nonwoven layer 3 is equipped with the adhesive layer 5. Accordingly, when installed the second nonwoven layer 3 faces inward, toward the cable 1. In this preferred case, the first woven layer 2 is oriented, when installed, so as to face outward.

Either way, the nonwoven or the second nonwoven layer 3 is produced, as a whole, from an aromatic polyamide. In fact, at this point fibers from the aromatic polyamide in question are used, in particular aramid fibers. The nonwoven or the second nonwoven layer 3 is formed, as a whole, as a mechanically strengthened needled felt. For this purpose, the nonwoven can be mechanically strengthened by water jets or needling.

The first woven layer 2 used at this point is one such in which the warp and weft filaments are produced from polyamide and/or polyester. In this case, the fineness of the warp and weft filaments may be the same in each case. Typically, finenesses of more than 100 dtex are used here for the warp and weft filaments.

The substrate band 2, 3 is provided as a whole with a basis weight of from 50 g/m² to 500 g/m². Furthermore, the substrate band 2, 3 or the adhesive tape as a whole has an abrasion resistance of at least class C according to LV 312. In general, an abrasion resistance of at least class D is observed. In addition, the substrate band 2, 3, and consequently the adhesive tape, is as a whole also formed so as to be impact resistant according to the specifications in LV 312.

The adhesive coating 5 is generally applied to the first layer 2 or the woven fabric having a grammage of from 50 g/m² to 150 g/m². In this case, conventional hot-melt adhesives such as those based on acrylate have been found to be particularly favorable, which adhesives can be applied, by way of example by a nozzle application process, to the first woven layer 2.

The invention claimed is:

1. An adhesive tape for wrapping cables in automobiles, the tape comprising:
    a first woven layer consisting of a woven fabric of aromatic polyamide warp and weft filaments and having a surface density of 50 g/m² to 200 g/m² and a fineness of at least 100 dtex with 5 to 60 filaments per cm;
    a second nonwoven layer made of a mechanically strengthened needled felt of aromatic polyamide filaments and having a surface density of 50 g/m² to 200 g/m²;
    a polymer layer and/or polymer filaments that penetrate and bond together the first woven layer and second nonwoven layer to form therewith a textile substrate band having two outer faces each formed by a respective one of the layers; and
    an adhesive layer applied to the outer face of the second layer.

2. The adhesive tape according to claim 1, wherein the second nonwoven layer faces inward when the tape is installed and wrapped around the cables.

3. The adhesive tape according to claim 1, wherein the second nonwoven layer is mechanically strengthened by water jets and/or air and/or needling.

4. The adhesive tape according to claim 1, wherein the tape has an abrasion resistance of at least class C according to LV 312, and is formed so as to be impact-resistant according to LV 312.

5. The adhesive tape according to claim 1, wherein the adhesive layer is applied to the substrate band at a basis weight of from 50 g/m² to 150 g/m².

6. An adhesive tape for wrapping cables in automobiles, the tape comprising:
    a first woven layer consisting of a woven fabric of aromatic polyamide warp and weft filaments and having a surface density of 50 g/m² to 200 g/m²;
    a second nonwoven layer made of a mechanically strengthened needled felt of aromatic polyamide filaments and having a surface density of 50 g/m² to 200 g/m²;
    a polymer layer and/or polymer filaments that penetrate and bond together the first woven layer and second nonwoven layer to form therewith a textile substrate band having two outer faces each formed by a respective one of the layers; and
    an adhesive layer applied to the outer face of the second layer and forming an inner face of the tape, the first woven layer forming an outer face of the tape.

* * * * *